(12) United States Patent
Kim et al.

(10) Patent No.: US 8,766,587 B2
(45) Date of Patent: Jul. 1, 2014

(54) MOTOR CONTROLLING APPARATUS AND CONTROLLING METHOD OF THE SAME

(75) Inventors: Mingi Kim, Seoul (KR); Oksun Yu, Seoul (KR); Kyunghoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 604 days.

(21) Appl. No.: 13/092,034

(22) Filed: Apr. 21, 2011

(65) Prior Publication Data

US 2011/0260664 A1 Oct. 27, 2011

(30) Foreign Application Priority Data

Apr. 22, 2010 (KR) .................. 10-2010-0037119

(51) Int. Cl.
*H02P 23/00* (2006.01)
*H02P 25/00* (2006.01)
*H02P 27/00* (2006.01)
*H02P 27/08* (2006.01)

(52) U.S. Cl.
CPC ............ *H02P 23/0077* (2013.01); *H02P 27/08* (2013.01)
USPC ........... 318/799; 318/811; 318/800; 318/801; 318/400.02; 318/400.32

(58) Field of Classification Search
USPC ............... 318/799, 811, 801, 400.32, 400.38
See application file for complete search history.

(56) References Cited

U.S. PATENT DOCUMENTS

| 6,225,774 | B1 * | 5/2001 | Masaki et al. | 318/723 |
| 6,388,416 | B1 * | 5/2002 | Nakatani et al. | 318/700 |
| 7,557,527 | B2 * | 7/2009 | Yoshimoto et al. | 318/432 |
| 7,710,063 | B2 * | 5/2010 | Yoshimoto et al. | 318/800 |
| 8,471,519 | B2 * | 6/2013 | Ito et al. | 318/801 |

FOREIGN PATENT DOCUMENTS

| JP | 11-122984 A | 4/1999 |
| JP | 2004-215466 | 7/2004 |
| KR | 10-1999-0081165 A | 11/1999 |
| KR | 10-2003-0010480 | 2/2003 |

* cited by examiner

*Primary Examiner* — Erick Glass
(74) *Attorney, Agent, or Firm* — McKenna Long & Aldridge LLP (57) ABSTRACT

Disclosed herein is a motor control apparatus and a method thereof. A phase error of the reference voltage output corresponding to a time delay caused by digital control may be compensated to stably control a motor, thereby improving the stability of a system. The phase compensation unit may be provided therein to convert a reference voltage of the synchronous coordinate system into a reference voltage of the stationary coordinate system when controlling the high-speed operation of the motor, thereby compensating a phase error of the reference voltage output, and allowing the motor to be operated at a high speed while maintaining its efficiency and reducing a volume of the compressor.

16 Claims, 6 Drawing Sheets

MOTOR CONTROLLING APPARATUS AND CONTROLLING METHOD OF THE SAME

CROSS-REFERENCE TO RELATED APPLICATIONS

Pursuant to 35 U.S.C. §119(a), this application claims the benefit of earlier filing date and right of priority to Korean Application No. 10-2010-0037119 filed on Apr. 22, 2010, the contents of which are incorporated by reference herein in its entirety.

BACKGROUND OF THE INVENTION

1. Field of the Invention

The present invention relates to an apparatus for controlling a motor, and more particularly, to a motor control apparatus for compensating a phase error of the output corresponding to a time delay generated by digital control to stably control a motor when controlling high-speed operation, and a method thereof.

2. Background of the Invention

Motors provided in a compressor do not include a sensor due to the difficulty of its installation. Accordingly, a control apparatus for driving the motor drives the motor using a sensorless algorithm. The sensorless algorithm calculates the position of a rotor to allow the user to drive the motor at his or her desired speed. A motor control apparatus corresponding to the related art may be operated up to a predetermined machine speed, for example, 120 Hz (hereinafter, normal operation), using this sensorless algorithm, but high-speed operation, for example, 150 Hz, is required to enhance the performance of a compressor. In order to operate a motor at a high speed, the stability of control should be secured and load responsiveness should be enhanced.

A motor control apparatus provided with a sensorless algorithm corresponding to the related art may be subjected to a comparator and a proportional integral controller to make the error to be "0" (zero) between a reference current and a detected current. Furthermore, the control apparatus controls the d-axis and q-axis of the synchronous coordinate system, respectively, to generate a reference voltage of the synchronous coordinate system, and converts it into a reference voltage of the stationary coordinate system. At this time, an angle of the stationary coordinate system may be represented θe as illustrated in FIG. 3.

Figure 3:
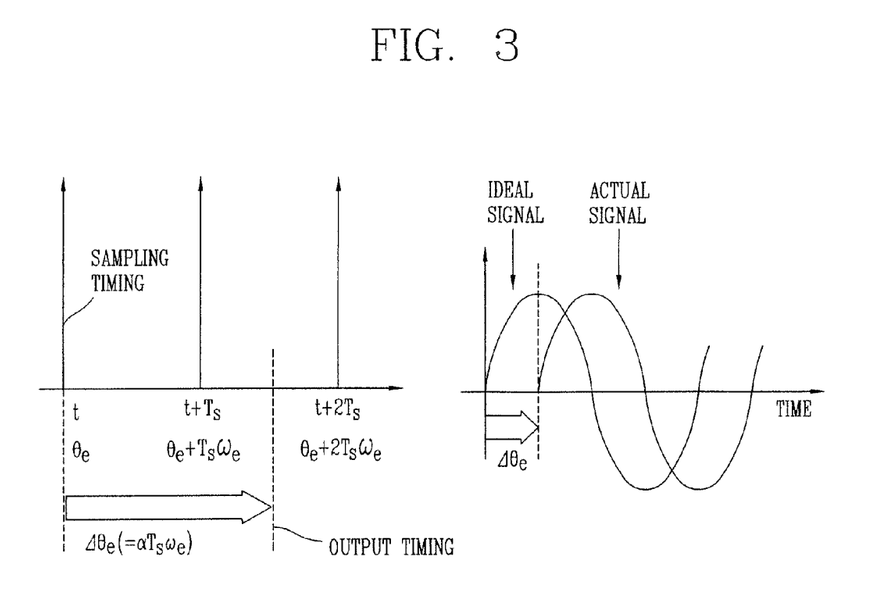
FIGS. 3 and 4 are views illustrated for explaining a phase error generated when controlling the high-speed operation of a motor.
Figure 4:
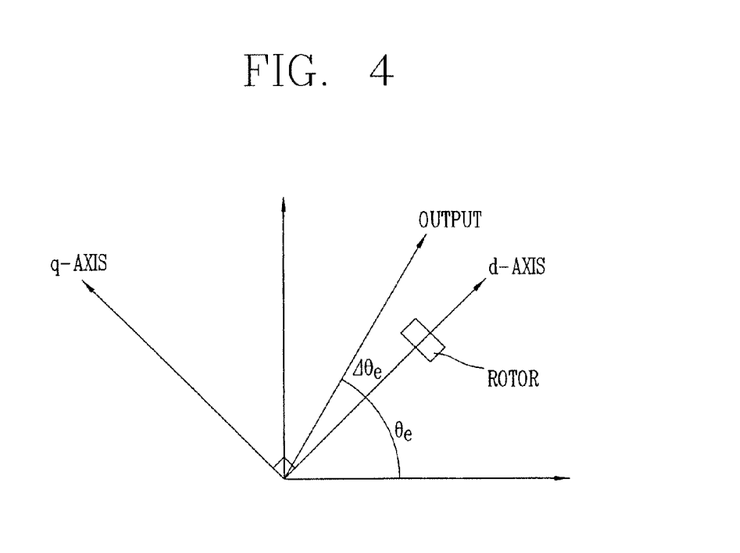

As illustrated in FIG. 3, in a motor control apparatus corresponding to the related art, a phase error of the voltage output may be generated due to digital control using a microcomputer (hereinafter, referred to as a "microcontroller"). In other words, a phase error occurs in the coordinate transformation of the reference voltage because a predetermined time is required to output a signal having a pulse width modulation waveform from the microcontroller to the motor. In other words, as illustrated in FIG. 3, in a motor control apparatus corresponding to the related art, assuming that a current sample period is Ts and the current sample is carried out at time t, a pulse width modulation signal output (reference voltage) is updated at t+Ts. FIG. 4 is a graph illustrating a phase error in FIG. 3, and as illustrated in the drawing, a phase delay as much as $\Delta\theta e$ may be generated at the output of the reference voltage. Accordingly, the motor control apparatus corresponding to the related art has a problem that actual output from the inverter to the motor may be implemented after time $\alpha Ts$, and a phase error of the voltage output may be further increased and its control stability may be reduced when operating the motor at a high speed.

SUMMARY OF THE INVENTION

The present invention is contrived to solve the foregoing problem, and an aspect of the present invention is to provide a motor control apparatus for compensating a phase error of the reference voltage output corresponding to a time delay generated by digital control to stably control a motor, and a method thereof.

Another aspect of the present invention is to provide a motor control apparatus having a phase compensation unit for converting a reference voltage of the synchronous coordinate system into a reference voltage of the stationary coordinate system to compensate a phase error of the reference voltage output when controlling high-speed motor operation, and a method thereof.

In order to accomplish the foregoing objectives, a motor control apparatus according to the present disclosure may include an inverter configured to apply a motor driving voltage to a motor based on a control signal, a current detection unit configured to detect a motor driving current applied to the motor, a microcontroller configured to sample the motor driving current, to generate the control signal based on the motor driving current, and to output the control signal to the inverter, and a phase compensation unit configured to compensate a phase error corresponding to a delay time of the microcontroller generating the control signal.

In a motor control apparatus according to the present disclosure, the microcontroller may include an calculation unit configured to calculate a speed of the motor based on the motor driving current, a speed controller configured to receive a reference motor speed and the calculated motor speed and to generate a reference current based on the reference motor speed and the calculated motor speed, a current controller configured to receive the reference current and a detection current and to generate a reference voltage based on the reference current and the detection current, and a pulse width modulation controller configured to compare a triangular carrier wave with the reference voltage and to generate the control signal corresponding to the comparison result.

In a motor control apparatus according to the present disclosure, the phase compensation unit may be a lead controller for compensating a phase lead corresponding to the speed of the motor and the sampling period of the motor driving current. Furthermore, the phase compensation unit may be provided between the current controller and the pulse width controller.

The current detection unit may be a current transducer connected between the inverter and the motor to continuously detect the motor driving current, or a shunt resistor connected in series to a switching element within the inverter.

In order to accomplish the foregoing objectives, a motor control method according to the present disclosure may include detecting a motor driving current applied to the motor, receiving a reference motor speed, calculating a reference voltage based on the motor driving current and the reference motor speed, generating a control signal based on the reference voltage and a triangular carrier wave, compensating a phase error corresponding to a delay time of generating the control signal, and outputting the control signal to the inverter.

In a motor control method according to the present disclosure, said calculating the reference voltage may include calculating a speed of the motor based on the motor driving current, calculating a reference current based on the reference motor speed and the calculated motor speed, and calculating the reference voltage based on the reference current and a detection current.

In a motor control method according to the present disclosure, said compensating the phase error may compensate a phase lead corresponding to the speed of the motor and the sampling period of the motor driving current.

A motor control method according to the present disclosure may further include calculating a phase error corresponding to the delay time.

According to the present disclosure, a phase error of the reference voltage output corresponding to a time delay caused by digital control may be compensated to stably control a motor, thereby improving the stability of a system.

According to the present disclosure, the phase compensation unit may be provided therein to convert a reference voltage of the synchronous coordinate system into a reference voltage of the stationary coordinate system when controlling the high-speed operation of the motor, thereby compensating a phase error of the reference voltage output, and allowing the motor to be operated at a high speed while maintaining its efficiency and reducing a volume of the compressor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a motor control apparatus and method thereof according to the present disclosure will be described in detail with reference to the accompanying drawings.

Figure 1:
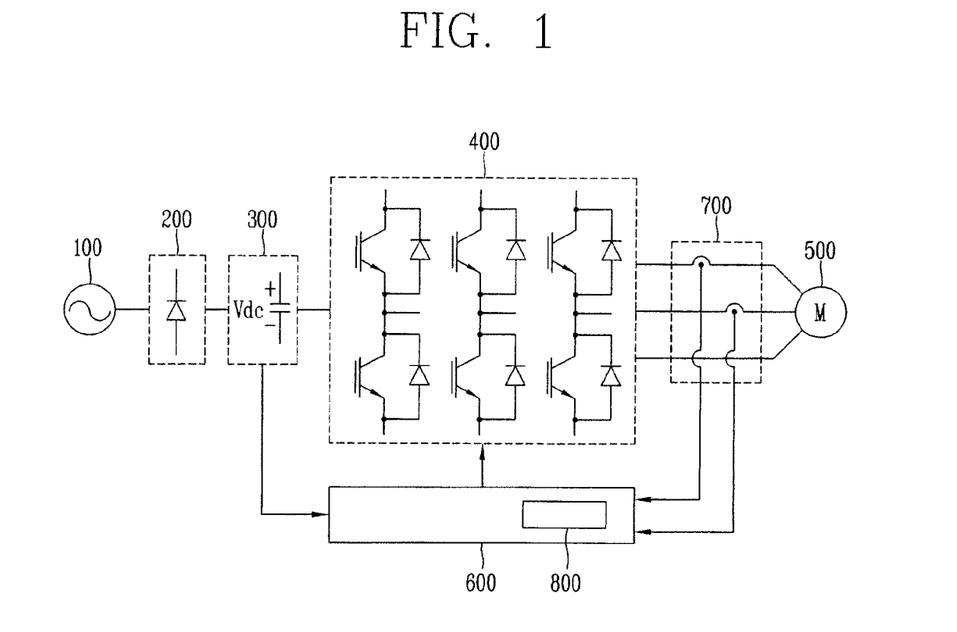
FIGS. 1 and 2 are a block diagrams schematically illustrating the configuration of a typical motor control apparatus to be applied to the present invention.
Figure 2:
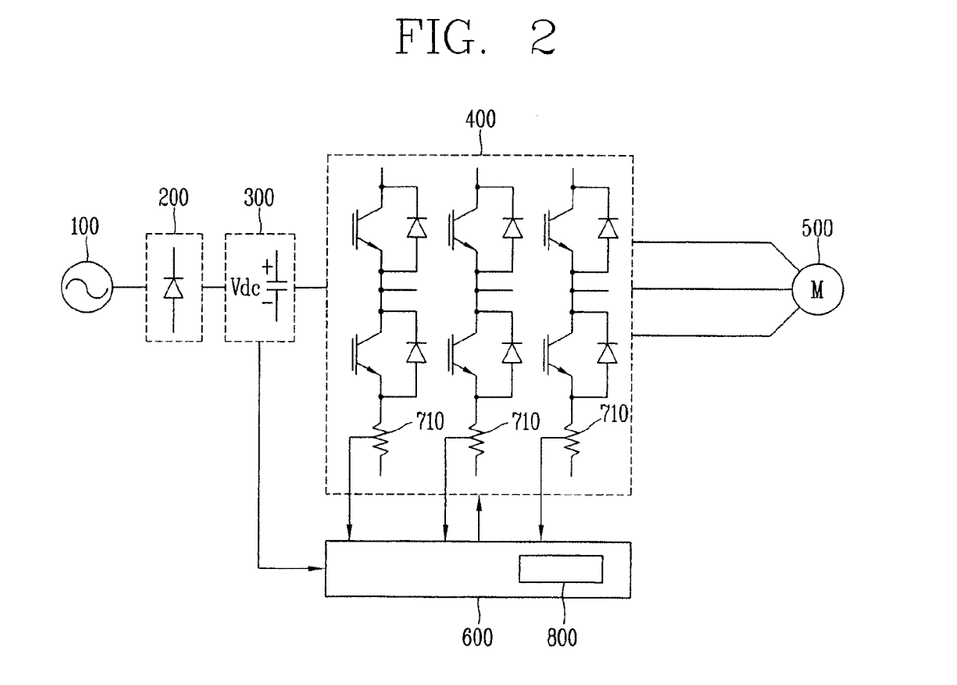

Referring to FIGS. 1 and 2, a typical motor control apparatus may include a converter 200 configured to convert an alternating-current voltage 100 to a direct-current voltage, a smoothing unit 300 configured to smooth the direct-current voltage, an inverter 400 configured to convert the smoothed direct-current voltage to apply a motor driving voltage to a motor 500, a current detection unit 700 configured to detect a motor driving current applied to the motor 500, and a microcontroller 600 configured to output a control signal to the inverter 400 to drive the motor 500.

In a motor control apparatus according to the present disclosure, the microcontroller samples the motor driving current to generate the control signal, and outputs the control signal to the inverter. The motor control apparatus according to the present disclosure may further include a phase compensation unit 800 for compensating a phase error corresponding to a delay time generated by the control signal generation time of the microcontroller. Here, the delay time means a time required from the time of receiving and sampling the motor driving current to the time of applying the motor driving voltage to the motor.

According to the present disclosure, the current detection unit 700 is a current transducer 700 connected between the inverter and the motor to continuously detect the motor driving current as illustrated in FIG. 1, or a shunt resistor connected in series to a switching element within the inverter as illustrated in FIG. 2. The current transducer detects the motor driving current and converts it into a voltage signal to output to the microcontroller 600. Furthermore, the current transducer detects the motor driving current during the overall interval of pulse width modulation. For example, in case of a three-phase brushless DC (BLDC) motor, the current detection unit 700 detects two phases (iu, iv) of a current applied thereto in three phases to output to the microcontroller 600. The microcontroller 600 generates an interrupt signal to sample a voltage signal corresponding to the detected motor driving current.

A motor control apparatus according to the present disclosure may further include an error calculation unit (not shown) for calculating a phase error due to the delay time. Taking a delay angle (phase error) corresponding to mechanical speed into consideration, it is seen that the delay angle is increased as raising the speed such as, 6° at 30 Hz, 13° at 60 Hz, 19° at 90 Hz, 26° at 120 Hz, and 32° at 150 Hz. The delay angle becomes a phase that should be compensated by using the phase compensation unit 800.

Figure 5:
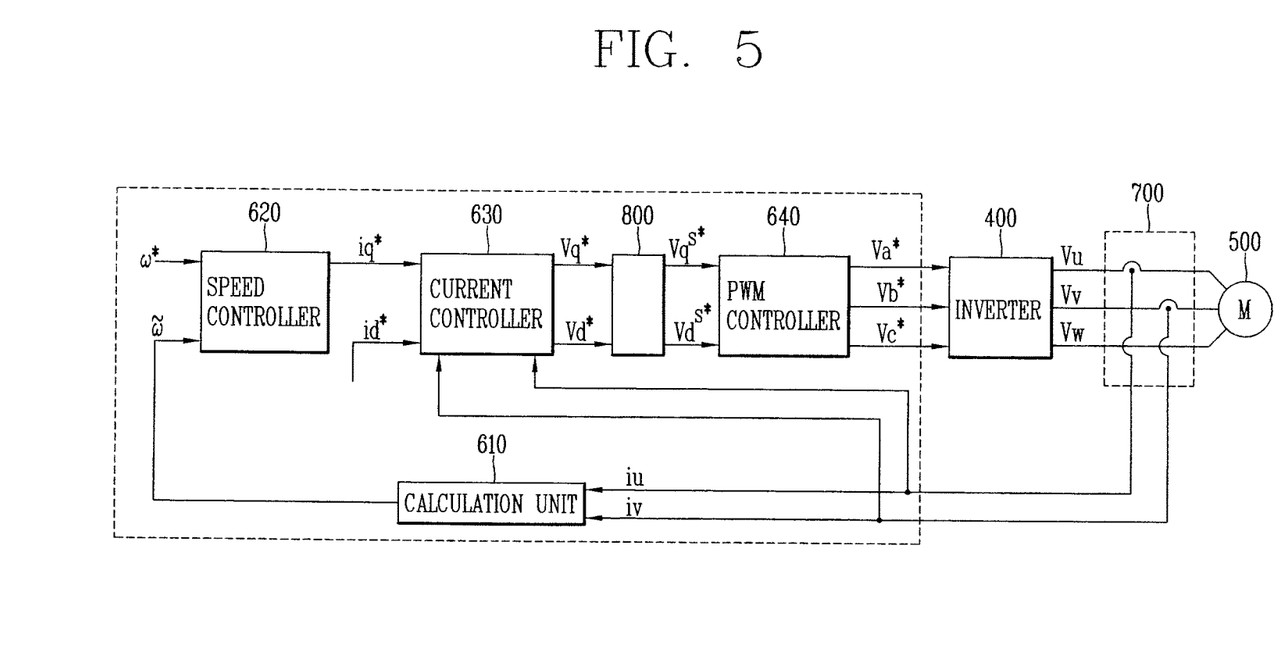
FIG. 5 is a view illustrating the detailed configuration of a motor control apparatus in FIG. 1.

Referring to FIG. 5, in a motor control apparatus according to the present disclosure, the microcontroller 600 may include an calculation unit 610 configured to receive the motor driving current, and calculate the speed of the motor and the position of a rotor provided in the motor, a speed controller 620 configured to receive the reference motor speed and the calculated motor speed to output a reference current, a current controller 630 configured to receive the reference current and the detection current to output the reference voltage, and a pulse width modulation controller 640 configured to compare the triangular carrier wave with the reference voltage to generate the control signal corresponding to the comparison result.

The calculation unit 610 receives a motor driving current detected by the current detection unit 700, and calculates and estimates the speed ($\omega$) of the motor and the position of a rotor provided in the motor using a sensorless algorithm.

The speed controller 620 may include a comparator (not shown) for comparing the user's desired reference motor speed ($\omega^*$) with the speed estimated and calculated by the calculation unit 610, and a first proportional integral (PI) controller (not shown), and receives the reference motor speed and the calculated motor speed and proportionally integrates a difference between the reference motor speed and the calculated motor speed, namely, a speed error, to generate a q-axis reference current ($i^*_q$), and output it to the current controller 630.

The current controller 630 receives a q-axis reference current and a d-axis reference current ($i^*_d$) generated by the speed controller 620 to generate and output a reference voltage. The current controller 630 allows a q-axis reference current to be passed through a second proportional integral controller and a filter and outputs a q-axis reference voltage ($V^*_q$) to the pulse width modulation controller 640. In other words, the current controller 630 compares the q-axis reference current with the q-axis calculated current ($i_q$) for which a motor driving current detected through the current detection unit 700 is axially translated, and allows a difference therebetween, namely, a current error, to be passed through a second proportional integral controller and a filter and outputs a q-axis reference voltage ($V^*_q$) to the pulse width modulation controller 640. On the other hand, the current controller 630 allows a d-axis reference current to be passed through a third proportional integral controller and a filter and outputs a d-axis reference voltage ($V^*_d$) to the pulse width modulation controller 640. In other words, the current controller 630 compares the d-axis reference current with the d-axis calculated current ($i_d$) for which a motor driving current detected through the current detection unit 700 is axially translated, and allows a difference therebetween, namely, a current error, to be passed through a third proportional integral controller and a filter and outputs a d-axis reference voltage ($V^*_d$) to the pulse width modulation controller 640. Here, (d, q) represents a synchronous coordinate system.

The pulse width modulation controller 640, first, axially translates a reference voltage of the synchronous coordinate system to a reference voltage of the stationary coordinate system. In other words, the pulse width modulation controller 640 transforms ($V^{e*}_d$, $V^{e*}_q$) into ($V^{s*}_d$, $V^{s*}_d$). Here, ($V^{s*}_d$, $V^{s*}_d$) may be shown as ($V^*_\alpha$, $V^*_\beta$). Furthermore, the pulse width modulation controller 640 converts and outputs a reference voltage of the stationary coordinate system to be matched to a motor form to be driven. For example, in case of a three-phase brushless DC (BLDC) motor, the pulse width modulation controller 640 converts a reference voltage of the stationary coordinate system into a reference voltage ($V^*_a$, $V^*_b$, $V^*_c$) in three phases to output to the inverter 400.

Figure 6:
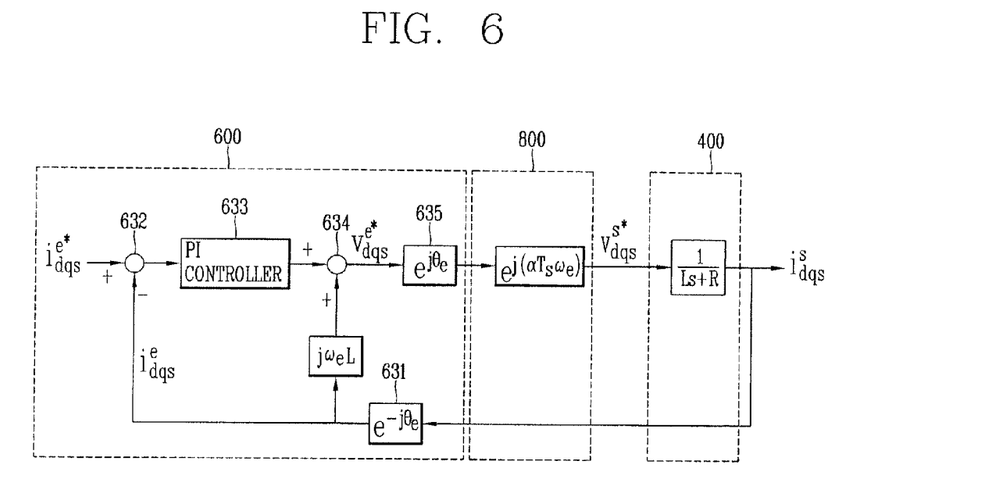
FIG. 6 is a view illustrating a mathematical model of a motor control apparatus corresponding to the present invention.
Figure 7:
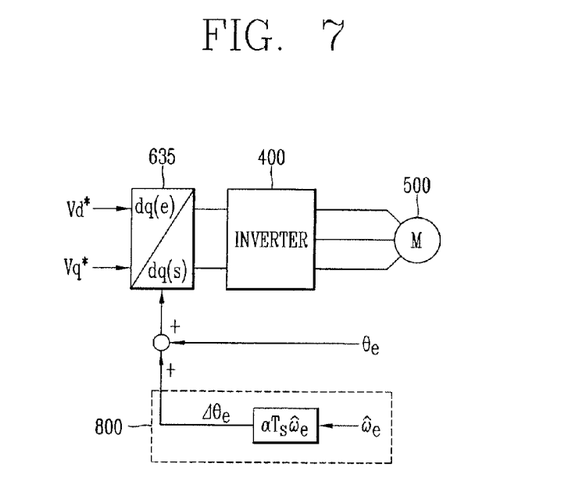
FIG. 7 is a view illustrated for explaining the compensation operation of a phase compensation unit in FIG. 6.

Referring to FIG. 5, the phase compensation unit 800 is provided between the current controller 630 and the pulse width controller 640, and added as a phase lead ($\Delta\theta_e$) in converting a reference voltage ($V^{e*}_d$, $V^{e*}_q$) of the synchronous coordinate system outputted from the current controller 630 into a reference voltage ($V^{s*}_d$, $V^{s*}_d$) of the stationary coordinate system. Furthermore, the phase compensation unit 800 is a lead controller for compensating a phase lead corresponding to the speed of the motor and the sampling period of the motor driving current. As illustrated in FIG. 6, for the current controller 630 of the microcontroller 600, its mathematical modelling may be possible in the form of combining axial transformation units 631, 635, a comparator 632, a proportional integral controller 633, and the like. The modelling of the motor 500 may be possible with an inductance (L) and a resistance (R). Referring to FIG. 6, a compensation angle of the phase compensation unit 800 is input to the output stage of the current controller 630 in the form of $e^{j(\alpha T_s \omega_e)}$. Furthermore, as illustrated in FIG. 7, the compensation angle of the phase compensation unit 800 may be summed in the form of $\alpha T_s \omega_e (=\Delta\theta_e)$ to be input to the axial transformation unit for transforming the synchronous coordinate system into the stationary coordinate system. Here, the $\alpha$ is a constant value, which is a value calculated by the error calculation unit or calculated through an experiment. Typically, the $\alpha$ is 1.5.

Figure 8:
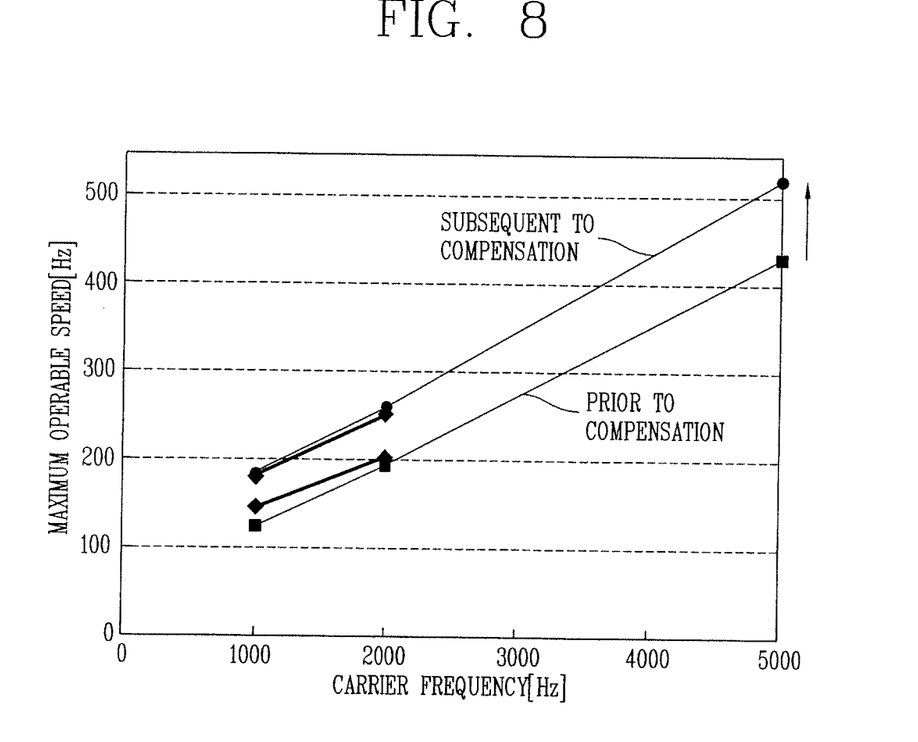
FIG. 8 is a graph in which the maximum operable speeds prior to and subsequent to phase compensation are compared to each other corresponding to the present invention.

FIG. 8 is a graph in which the maximum speeds capable of operating a motor through an experiment prior to and subsequent to phase compensation are compared to each other. Here, it is seen that the maximum operable speed subsequent to the compensation is larger than that prior to the compensation, and it is also shown that a difference between the maximum operable speeds subsequent to the compensation is more increased than that prior to the compensation as raising the frequency of a carrier wave.

Figure 9:
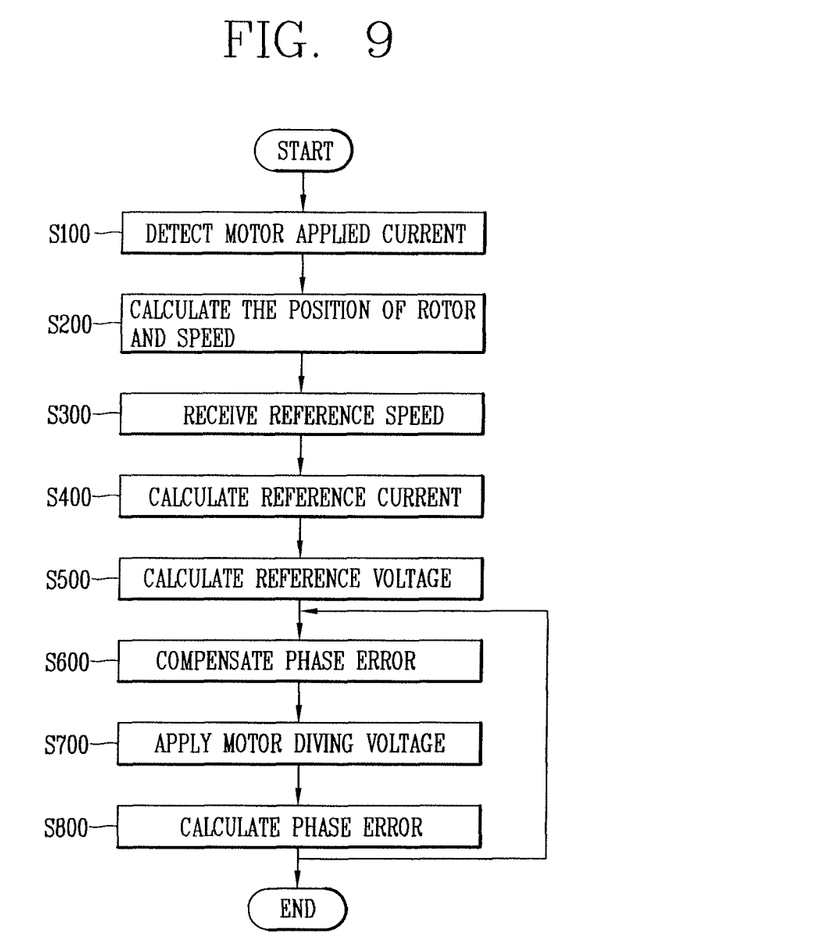
FIG. 9 is a flow chart schematically illustrating the control method of a motor control apparatus corresponding to the present invention.

Referring to FIG. 9, in a control method of a motor control apparatus according to the present disclosure, the motor control apparatus is provided with a converter configured to convert an alternating-current voltage to a direct-current voltage, a smoothing unit configured to smooth the direct-current voltage, and an inverter configured to convert the smoothed direct-current voltage to apply a motor driving voltage to a motor, and the method may include detecting a motor driving current applied to the motor (S100), receiving a reference motor speed (S300), calculating the reference voltage based on the motor driving current and reference motor speed (S500), generating a control signal based on the reference voltage and triangular carrier wave (not shown), compensating a phase error corresponding to a delay time generated by the control signal generation time (S600), and outputting the control signal to the inverter (S700). Here, the delay time is a time required from the start of receiving and sampling the motor driving current to the time of applying the motor driving voltage to the motor.

Said calculating the reference voltage (S500) may include calculating the speed of the motor and the position of a rotor provided in the motor (S200), calculating a reference current based on the reference motor speed and the calculated motor speed (S300), and calculates the reference voltage based on the reference current and the detection current.

The control method may further include calculating a phase error corresponding to the delay time (S800).

Here, said generating the control signal may include comparing the triangular carrier wave with the reference voltage, and the control signal is generated corresponding to the comparison result. Hereinafter, the configuration of the apparatus will be described with reference to FIGS. 1 through 8.

The motor control apparatus detects a motor driving current applied to the motor using a current detection unit (S100), and estimates and calculates the speed of the motor and the position of a rotor using the detected motor driving current (S200). Here, for the current detection unit, a current transducer connected between the inverter and the motor may be preferably used to continuously detect the motor driving current. Of course, a shunt resistor connected in series to a switching element within the inverter may be also used for the current detection unit. The current transducer detects the motor driving current and converts it into a voltage signal to output to the microcontroller, and detects the motor driving current during the overall interval of pulse width modulation. For example, in case of a three-phase brushless DC (BLDC) motor, the current detection unit detects two phases (iu, iv) of a current applied thereto in three phases to output to an calculation unit of the microcontroller, and the calculation unit estimates and calculates the speed of the motor and the position of a rotor using a sensorless algorithm therefrom (S200). The microcontroller generates an interrupt signal to sample a voltage signal corresponding to the detected motor driving current.

The speed controller receives or calculates the user's desired reference motor speed, and receives the reference motor speed and the calculated motor speed and proportionally integrates a difference between the reference motor speed and the calculated motor speed, namely, a speed error, to calculate a q-axis reference current (S400). The current controller receives a q-axis reference current and a d-axis reference current to generate and output a reference voltage (S500). The current controller compares the q-axis reference current with the q-axis calculated current for which a motor driving current is axially translated, and allows a difference therebetween, namely, a current error, to be passed through a second proportional integral controller and a filter and calculates a q-axis reference voltage, and compares the d-axis reference current with the d-axis calculated current for which a motor driving current is axially translated, and allows a difference therebetween, namely, a current error, to be passed through a third proportional integral controller and a filter and calculates a d-axis reference voltage (S500). The pulse width modulation controller axially translates a reference voltage of the synchronous coordinate system to a reference voltage of the stationary coordinate system. Furthermore, the pulse width modulation controller converts and outputs a reference voltage of the stationary coordinate system to be matched to a motor form to be driven. For example, in case of a three-phase brushless DC (BLDC) motor, the pulse width modulation controller converts a reference voltage of the stationary coordinate system into a reference voltage in three phases to output to the inverter. The phase compensation unit is added as a phase lead in converting a reference voltage of the synchronous coordinate system to a reference voltage of the stationary coordinate system (S600). In other words, the phase compensation unit is a lead controller for compensating a phase lead corresponding to the speed of the motor and the sampling period of the motor driving current. Referring to FIG. 6, a compensation angle of the phase compensation unit is input to the output stage of the current controller in the form of $e^{j(\alpha T_s \omega_e)}$. Furthermore, as illustrated in FIG. 7, the compensation angle may be summed in the form of $\alpha T_s \omega_e (=\Delta \theta_e)$ to be input to the axial transformation unit for transforming the synchronous coordinate system into the stationary coordinate system. Here, the $\alpha$ is a constant value, which is a value calculated by the error calculation unit or calculated through an experiment. Typically, the $\alpha$ is 1.5. As illustrated in FIG. 8, when a control method of a motor control apparatus according to the present disclosure is used, it is seen that the maximum operable speed subsequent to the compensation is larger than that prior to the compensation, and it is also shown that a difference between the maximum operable speeds subsequent to the compensation is more increased than that prior to the compensation as raising the frequency of a carrier wave.

In addition, the phase compensation unit may be configured and provided with a separate hardware or firmware, and may be implemented by either one of a module form and a software algorithm within the microcontroller.

As described above, in a motor control apparatus according to the present disclosure and a method thereof, a phase error of the reference voltage output corresponding to a time delay caused by digital control may be compensated to stably control a motor, thereby improving the stability of a system. The phase compensation unit may be provided therein to convert a reference voltage of the synchronous coordinate system into a reference voltage of the stationary coordinate system when controlling the high-speed operation of the motor, thereby compensating a phase error of the reference voltage output, and allowing the motor to be operated at a high speed while maintaining its efficiency and reducing a volume of the compressor.

What is claimed is:

1. A motor control apparatus, comprising:
    an inverter configured to apply a motor driving voltage to a motor based on a control signal;
    a current detection unit configured to detect a motor driving current applied to the motor;
    a microcontroller configured to sample the motor driving current, to generate the control signal based on the motor driving current, and to output the control signal to the inverter; and
    a phase compensation unit configured to compensate a phase error corresponding to a delay time of the microcontroller generating the control signal,
    wherein the delay time is a time required from the timing of starting the sampling to the timing of applying the motor driving voltage to the motor.

2. The motor control apparatus of claim 1, wherein the microcontroller comprises:
    an calculation unit configured to calculate a speed of the motor based on the motor driving current;
    a speed controller configured to receive a reference motor speed and the calculated motor speed and to generate a reference current based on the reference motor speed and the calculated motor speed;
    a current controller configured to receive the reference current and a detection current and to generate a reference voltage based on the reference current and the detection current; and
    a pulse width modulation controller configured to compare a triangular carrier wave with the reference voltage and to generate the control signal corresponding to the comparison result.

3. The motor control apparatus of claim 2, wherein the phase compensation unit is a lead controller for compensating a phase lead corresponding to the speed of the motor and the sampling period of the motor driving current.

4. The motor control apparatus of claim 3, wherein the phase compensation unit is provided between the current controller and the pulse width controller.

5. The motor control apparatus of claim 1, further comprising:
    an error calculation unit configured to calculate the phase error corresponding to the delay time.

6. The motor control apparatus of claim 1, wherein the current detection unit is a current transducer connected between the inverter and the motor to continuously detect the motor driving current.

7. The motor control apparatus of claim 1, wherein the current detection unit is a shunt resistor connected in series to a switching element within the inverter.

8. A control method of a motor control apparatus provided with a converter configured to convert an alternating-current voltage to a direct-current voltage, a smoothing unit configured to smooth the direct-current voltage, and an inverter configured to convert the smoothed direct-current voltage to apply a motor driving voltage to a motor, the method comprising:
    detecting a motor driving current applied to the motor;
    receiving a reference motor speed;
    calculating a reference voltage based on the motor driving current and the reference motor speed;
    generating a control signal based on the reference voltage and a triangular carrier wave;
    compensating a phase error corresponding to a delay time of generating the control signal; and
    outputting the control signal to the inverter,
    wherein the delay time is a time required from the timing of starting the sampling to the timing of applying the motor driving voltage to the motor.

9. The method of claim 8, wherein said calculating the reference voltage comprises:
    calculating a speed of the motor based on the motor driving current;

calculating a reference current based on the reference motor speed and the calculated motor speed; and calculating the reference voltage based on the reference current and a detection current.

10. The method of claim 9, wherein said generating the control signal comprises:

comparing the triangular carrier wave with the reference voltage, wherein the control signal is generated corresponding to the comparison result.

11. The method of claim 8, wherein said compensating the phase error compensates a phase lead corresponding to the speed of the motor and the sampling period of the motor driving current.

12. The method of claim 8, further comprising:

calculating the phase error corresponding to the delay time.

13. A motor control apparatus, comprising:

an inverter configured to apply a motor driving voltage to a motor based on a control signal;

a current detection unit configured to detect a motor driving current applied to the motor;

a microcontroller configured to sample the motor driving current, to generate the control signal based on the motor driving current, and to output the control signal to the inverter; and a phase compensation unit configured to compensate a phase error corresponding to a delay time of the microcontroller generating the control signal by using a phase lead according to the speed of the motor and the sampling period of the motor driving current.

14. The motor control apparatus of claim 13, wherein the phase compensation unit is implemented within the microcontroller.

15. The motor control apparatus of claim 13, further comprising:

an error calculation unit configured to calculate the phase error corresponding to the delay time.

16. The motor control apparatus of claim 13, wherein the delay time is a time from the time of starting the sampling to the time of applying the motor driving voltage to the motor.

* * * * *